(12) United States Patent
Swanson et al.

(10) Patent No.: US 10,473,238 B2
(45) Date of Patent: Nov. 12, 2019

(54) METHODS OF LAYING SUBSEA PIPELINES

(71) Applicant: SHELL OIL COMPANY, Houston, TX (US)

(72) Inventors: Richard Conrad Swanson, Houston, TX (US); Bruce Davis Light, The Woodlands, TX (US); Ta-Ming Hsu, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/741,426

(22) PCT Filed: Jun. 30, 2016

(86) PCT No.: PCT/US2016/040410
§ 371 (c)(1),
(2) Date: Jan. 2, 2018

(87) PCT Pub. No.: WO2017/007682
PCT Pub. Date: Jan. 12, 2017

(65) Prior Publication Data
US 2018/0372244 A1  Dec. 27, 2018

Related U.S. Application Data (60) Provisional application No. 62/188,917, filed on Jul. 6, 2015.

(51) Int. Cl.
*B63B 35/03* (2006.01)
*F16L 1/12* (2006.01)
*E21B 43/013* (2006.01)
*F16L 1/16* (2006.01)
*F16L 1/20* (2006.01)

(52) U.S. Cl.
CPC .............. *F16L 1/123* (2013.01); *B63B 35/03* (2013.01); *E21B 43/013* (2013.01); *F16L 1/16* (2013.01); *F16L 1/201* (2013.01)

(58) Field of Classification Search
CPC ... F16L 1/123; F16L 1/16; F16L 1/201; B63B 35/03; E21B 43/013
See application file for complete search history.

(56) References Cited

U.S. PATENT DOCUMENTS

| 3,438,213 | A |   | 4/1969  | Broussard et al. |
| 4,687,377 | A |   | 8/1987  | Langner |
| 5,403,121 | A | * | 4/1995  | Lanan ................. E21B 43/0107 138/118 |
| 5,836,719 | A |   | 11/1998 | Martin et al. |

(Continued)

FOREIGN PATENT DOCUMENTS

| EP | 2042794 A1 | 4/2009 |
| GB | 1540650 A | 2/1979 |

OTHER PUBLICATIONS

International Search Report and Written Opinion received for PCT Patent Application No. PCT/US2016/040410, dated Oct. 13, 2016, 12 pages.

*Primary Examiner* — Benjamin F Fiorello (57) ABSTRACT

Methods of laying subsea pipeline (1300) on a seafloor comprising: providing a pipe laying vessel (1100), placing a spooling structure assembly (1200) on the seafloor, and laying the subsea pipeline (1300) in a loop around the spooling structure assembly and associated systems.

19 Claims, 4 Drawing Sheets

(56) References Cited

U.S. PATENT DOCUMENTS

| | | |
|---|---|---|
| 5,971,666 A | 10/1999 | Martin et al. |
| 6,460,796 B1 | 10/2002 | Berning et al. |
| 6,910,830 B2 * | 6/2005 | Endal ........................ F16L 1/18 |
| | | 138/118 |
| 8,043,027 B2 * | 10/2011 | Duroch ................... F16L 1/201 |
| | | 405/184.4 |
| 8,562,255 B2 * | 10/2013 | Persson ................... F16L 1/123 |
| | | 138/110 |
| 2011/0274498 A1 | 11/2011 | Alliot |
| 2012/0020739 A1 | 1/2012 | Lyngberg et al. |
| 2012/0037265 A1 | 2/2012 | Bodanese et al. |
| 2014/0227039 A1 | 8/2014 | Landwijk |
| 2014/0334880 A1 | 11/2014 | Roodenburg et al. |

* cited by examiner

METHODS OF LAYING SUBSEA PIPELINES

CROSS-REFERENCE TO RELATED APPLICATIONS

The present application is a National Stage (§ 371) application of PCT/US2016/040410, filed Jun. 30, 2016, which claims the benefit of U.S. Application No. 62/188,917, filed Jul. 6, 2015, which is incorporated herein by reference in its entirety.

BACKGROUND

The present disclosure relates generally to methods for laying subsea pipelines. More specifically, in certain embodiments the present disclosure relates to methods of laying subsea pipelines comprising expansion loops and associated systems.

In the offshore oil and gas industry pipelines are frequently placed on the seafloor to connect wells to production platforms on the surface, or other structures on the seafloor. Typically, these pipelines are placed on the seafloor utilizing a pipe laying vessel.

Briefly, a pipe laying vessel is a specialized floating facility capable of deploying subsea pipelines from its deck to the sea floor. Examples of conventional pipe laying vessels and methods of laying subsea pipelines are described in U.S. Pat. Nos. 5,971,666, 5,836,719, and 3,438,213, European Patent No. 3,438,213, and U.S. Patent Application Publication Nos. 2014/0334880, 2014/0227039, 2012/0020739, and 2011/0274498, the entireties of which are hereby incorporated by reference.

As the temperatures and pressures of production fluids have become higher as higher pressure and higher temperature offshore wells are being developed, one of the major design challenges for subsea pipelines is the reduction and accommodation of the effect of these high pressures and temperatures on subsea pipelines. Subsea pipeline systems must be capable of accommodating growth of the pipelines due to expansion introduced by temperature and pressure. If this expansion is not accommodated then the pipelines may exceed their allowable limits of stress in the materials and, if the cyclic stress amplitudes are high enough in magnitude and number, potentially cause fatigue of the material. Another difficulty that must be addressed is the tendency of pipelines to "walk," that is physically move, in response to this expansion, particularly if such expansion, or other loading, is asymmetric.

One current method to accommodate expansion of pipelines to mitigate the above problems is to provide expansion loops at several points along the extent of the pipeline. Expansion loops may be installed onto subsea pipelines after the subsea pipelines have been laid. The installation of these expansion loops may be a difficult process, since the loop needs to be inserted into the line after placement of the pipeline on the seafloor or made up before deploying the subsea pipeline. Each of the insertion methods requires the use of connection equipment, generally referred to as "connectors." Conventional expansion loops require connectors at each end of the loop to connect them to the subsea pipelines. The seals of such connectors however may be subject to failure due to the movements of the subsea pipelines and other factors, such as aging, chemical attack and unexpected loading.

It is desirable to develop methods of laying subsea pipelines that comprise one or more expansion loops that do not require the use of connecters to join the subsea pipelines to the expansion loops. It is also desirable to develop a method of laying a continuous section of subsea pipeline that comprises one or more expansion loops.

SUMMARY

The present disclosure relates generally to methods for laying subsea pipelines. More specifically, in certain embodiments the present disclosure relates to methods of laying subsea pipelines comprising expansion loops and associated systems.

In another embodiment, the present disclosure provides a spooling structure assembly comprising: a pile, a spool surrounding the pile, and a pipe support attached to the spool.

In one embodiment, the present disclosure provides a method of laying subsea pipeline on a seafloor comprising: providing a pipe laying vessel, placing a spooling structure assembly on the seafloor, and laying the subsea pipeline in a loop around the spooling structure assembly.

In another embodiment, the present disclosure provides a subsea pipeline system comprising: a pipe laying vessel, a subsea pipeline, and a spooling structure assembly, wherein the subsea pipeline is wrapped around the spooling structure assembly.

BRIEF DESCRIPTION OF THE DRAWINGS

A more complete and thorough understanding of the present embodiments and advantages thereof may be acquired by referring to the following description taken in conjunction with the accompanying drawings.

The features and advantages of the present disclosure will be readily apparent to those skilled in the art. While numerous changes may be made by those skilled in the art, such changes are within the spirit of the disclosure.

DETAILED DESCRIPTION

The description that follows includes exemplary apparatuses, methods, techniques, and/or instruction sequences that embody techniques of the inventive subject matter. However, it is understood that the described embodiments may be practiced without these specific details.

The present disclosure relates generally to methods for laying subsea pipelines. More specifically, in certain embodiments the present disclosure relates to methods of laying subsea pipelines comprising expansion loops and associated systems.

One potential advantage of the methods discussed herein is that they allow the laying of subsea pipelines and the creation of expansion loops that do not require the installation of expansion loops, or other components, after the subsea pipeline is laid. In certain embodiments, the methods discussed herein allow for the installation of expansion loops in subsea pipelines without requiring additional mechanical components such as connectors, flanges, and seals. Another potential advantage of the methods discussed herein is that they allow the laying of a continuous section of a subsea pipeline that comprises at least one expansion loop.

In certain embodiments, the present disclosure describes a procedure for forming expansion loops on a seafloor while laying a subsea pipeline. In certain embodiments, the expansion loops may accommodate the pipeline expansion and provide a mechanism for preventing or abating "walking" by forming one or more anchors at the points at which loops are formed. In certain embodiments, the expansion loops may be capable of accommodating expansion due to temperature and pressure inside the subsea pipeline when in operation. In certain embodiments, the expansion loops may be used for fluid processing. In certain embodiments, the loops may be formed on the seafloor by the use of one or more spooling structure assemblies.

Figure 1:
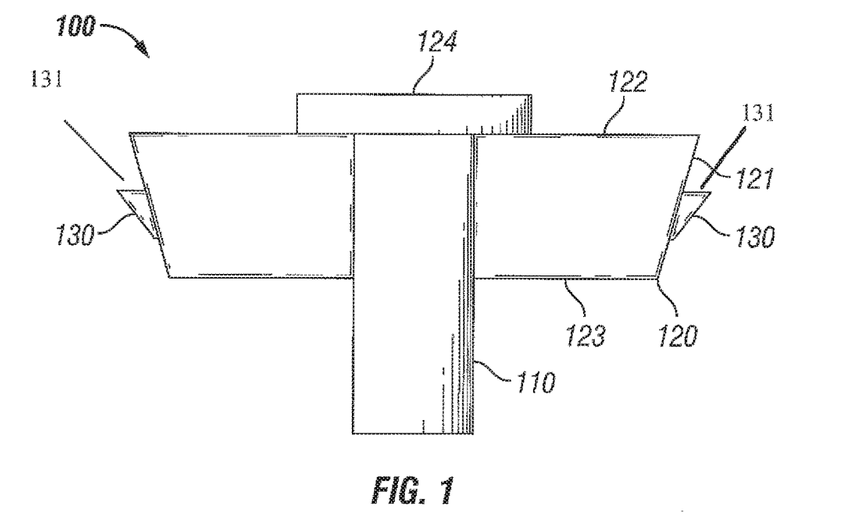
FIG. 1 illustrates a spooling structure assembly in accordance with certain embodiments of the present disclosure.

In certain embodiments, the present disclosure provides a spooling structure assembly. Referring now to FIG. 1, FIG. 1 illustrates spooling structure assembly 100. In certain embodiments, spooling structure assembly 100 may comprise pile 110, spool 120, and pipe support 130.

In certain embodiments, pile 110 may comprise any type of pile. Examples of suitable types of piles include driven piles, jetted-in piles, suction piles, pin piles, self-driven piles, and hammer-driven piles. In certain embodiments, the size and type of pile 110 may depend on the specific design of the pipeline and the type of lay vessel used to lay the pipeline. In certain embodiments, pile 110 may be constructed out of steel plates and structural framing.

In certain embodiments, pile 110 may have a diameter in the range of from 5 to 30 feet. In certain embodiments, pile 110 may have a diameter in the range of from 10 to 20 feet. In other embodiments, pile 110 may have a diameter in the range of from 12 to 15 feet.

In certain embodiments, pile 110 may have a length in the range of from 25 to 150 feet. In certain embodiments, pile 110 may have a length in the range of from 50 to 100 feet. In other embodiments, pile 110 may have a length in the range of from 60 to 75 feet.

In certain embodiments, a portion of pile 110 may be capable of being driven into a sea floor. In certain embodiments, 10 to 50 feet of pile 110 may be capable of being driven into a sea floor. In certain embodiments, 20 to 80 feet of pile 110 may be capable of being driven into a sea floor. In other embodiments, 50 to 100 feet of pile 110 may be capable of being driven into a sea floor.

In certain embodiments, spool 120 may comprise any structure which a subsea pipeline may be wrapped around in a loop. In certain embodiments, spool 120 may comprise a spooling surface 121, a top surface 122, and a bottom surface 123. In certain embodiments, bottom surface 123 may be capable of contacting a sea floor. In certain embodiments, a subsea pipeline may be wrapped around spool 120 contacting spooling surface 121. In certain embodiments, spool 120 may define a cavity. In certain embodiments, pile 110 may be capable of being disposed within the cavity. In certain embodiments, spool 120 may be constructed of steel plates and structural framing In certain embodiments, spool 120 may have a circle or oval cross section in plan view. In certain embodiments, the cross section of spool 120 may have a diameter in the range of from 10 feet to 100 feet. In certain embodiments, the cross section of spool 120 may have a diameter in the range of from 20 feet to 80 feet. In other embodiments, the cross section of spool 120 may have a diameter in the range of from 30 feet to 60 feet.

In certain embodiments, the cross section of spool 120 may have a uniform diameter. In other embodiments, spool 120 may have a taper. In certain embodiments, the taper may enable spool 120 to have a larger diameter at a top of spool 120 than at a bottom of spool 120. In other embodiments, the taper may enable spool 120 to have a smaller diameter at the top of spool 120 than at the bottom of spool 120. In certain embodiments, spool 120 may have a taper in the range of from 0 degrees to 20 degrees. In other embodiments, spool 120 may have a taper in the range of from 3 degrees to 10 degrees. In other embodiments, spool 120 may have a taper in the range of from 5 degrees to 7 degrees.

In certain embodiments, spool 120 may have a height in the range of from 1 to 20 feet. In certain embodiments, spool 120 may have a height in the range of from 2 to 15 feet. In other embodiments, spool 120 may have a height in the range of from 3 feet to 10 feet. In other embodiments, spool 120 may have a height in the range of from 4 to 6 feet. In certain embodiments, spool 120 may have a height sufficient to ensure that a subsea pipeline may be wrapped around spooling 120 contact spooling surface 121.

In certain embodiments, pile 110 may be disposed within the cavity of spool 120. In certain embodiments, spool 120 may surround pile 110. In certain embodiments, pile 110 may be connected to spool 120 by connectors 124. In certain embodiments, connectors 124 may comprise any conventional connection mechanisms. Examples of conventional connection mechanisms include pins, locking mechanisms, adaptations of well head connectors, and other latching mechanisms. In certain embodiments, connectors 124 are capable of preventing spool 120 from being lifted off of pile 110 when a subsea pipeline is wrapped around spool 120. In certain embodiments, connectors 124 are capable of preventing spool 120 from rotating around pile 110 while a subsea pipeline is wrapped around spool 120. In certain embodiments, connectors 124 may be disconnected from spool 120 and/or pile 110 by a remote operated vehicle. In certain embodiments, spool 120 may be removed from pile 110 once connectors 124 are disconnected from spool 120 and/or pile 110.

In certain embodiments, spooling structure assembly 100 may comprise one or more pipe supports 130. In certain embodiments, the pipe supports may be attached to spooling surface 121 of spooling structure assembly 100. In certain embodiments, pipe supports 130 may comprise any support that is capable of supporting a subsea pipeline wrapped around spooling structure assembly 100. In certain embodiments, pipe supports 130 may be constructed of steel plates and structural framing or composite materials.

In certain embodiments, pipe supports 130 may comprise a single protrusion around an entire circumference of spooling surface 121. In other embodiments, pipe supports 130 may comprise multiple protrusions 131 equispaced apart along a circumference of spooling surface 121. In other embodiments, pipe supports 130 may comprise multiple protrusions 131 that are not equispaced apart along a circumference of spooling surface 121. In certain embodiments, spooling structure assembly 100 may comprise one, two, three, four, five, or six protrusions. In certain embodiments, each protrusion may comprise a surface 131. In certain embodiments, a subsea pipeline may be capable of resting on top of surface 131. In certain embodiments, each protrusion may comprise a plate structure comprising surface 131.

In certain embodiments, pipe supports 130 may be positioned at a bottom of spool 120. In such embodiments, pipe supports 130 may be capable of resting on a sea floor. In other embodiments, pipe supports 130 may be positioned 3 to 6 feet above a bottom of spool 120. In certain embodiments, pipe supports 130 may be capable of being disconnected from spooling structure assembly 100. In certain embodiments, pipe supports 130 may be movable. In certain embodiments, pipe supports 130 may comprise hinges with hydraulic cylinders that may be capable of being activated by remotely operated vehicles. In certain embodiments, pipe supports 130 may be capable of being moved after a subsea pipeline is wrapped around spool 120. In other embodiments, pipe supports 130 may be capable of being disconnected from spool 120 and remain resting on a sea floor and/or contacting a subsea pipeline after spool 120 is lifted away from a seafloor.

In certain embodiments, a pipeline may be wrapped around spooling structure assembly 100. In certain embodiments, the pipeline may be wrapped once around spooling structure assembly 100. In other embodiments, the pipeline may be wrapped around spooling structure assembly 100 multiple times. In certain embodiments, the pipeline may be wrapped only partially around spooling structure assembly 100. In such embodiments, the pipeline may be wrapped around spooling structure assembly 100 in an amount in the range of from 15 degrees to 360 degrees. In certain embodiments, the pipeline may be wrapped around spooling structure assembly 100 in an amount in the range of from 30 degrees to 330 degrees. In certain embodiments, the pipeline may be wrapped around spooling structure assembly 100 in an amount in the range of from 90 degrees to 360 degrees. In certain embodiments, the pipeline may be wrapped around spooling structure assembly 100 in an amount in the range of from 180 degrees to 360 degrees. In certain embodiments, the pipeline may be wrapped around spooling structure assembly 100 in an amount in the range of from 270 degrees to 360 degrees. In certain embodiments, the pipeline may be wrapped around spooling structure assembly 100 in an amount in the range of from 360 degrees to 540 degrees. In certain embodiments, the pipeline may be wrapped around spooling structure assembly 100 in an amount in the range of from 540 degrees to 720 degrees.

Figure 2:
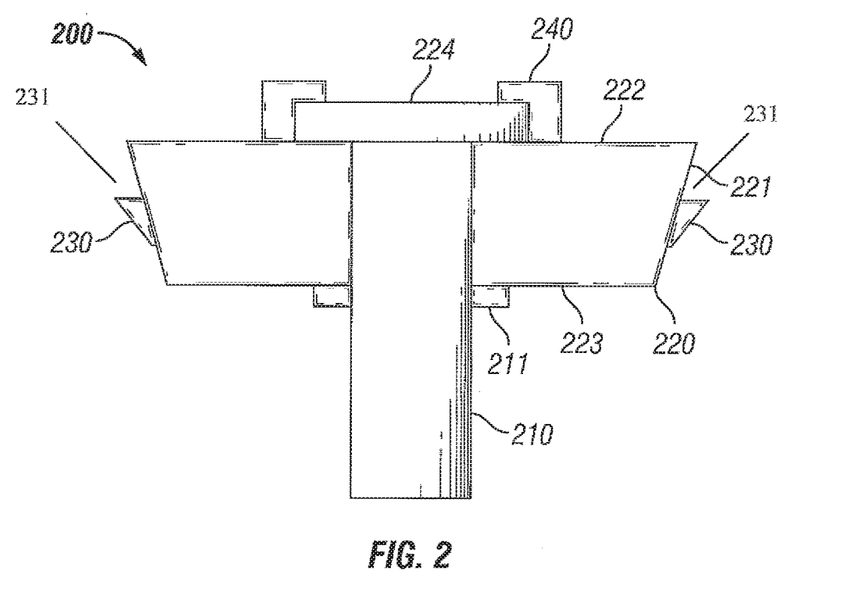
FIG. 2 illustrates a spooling structure assembly in accordance with certain embodiments of the present disclosure.

Referring now to FIG. 2, FIG. 2 illustrates spooling structure assembly 200. In certain embodiments, spooling structure assembly 200 may comprise pile 210, spool 220, and pipe support 230.

In certain embodiments, pile 210 may comprise any combination of features discussed above with respect to pile 110. In certain embodiments, pile 210 may comprise stops 211. In certain embodiments, stops 211 may comprise any structural device capable of supporting spool 220.

In certain embodiments, spool 220 may comprise any combination of features discussed above with respect to spool 120. In certain embodiments, spool 220 may comprise a spooling surface 221, a top surface 222, and a bottom surface 223. In certain embodiments, bottom surface 223 may be capable of resting above a sea floor when spooling structure assembly 200 is installed on a sea floor. In such embodiments, bottom surface 223 may be capable of resting a height in the range of from 0 feet to 20 feet above the sea floor. In such embodiments, bottom surface 223 may be capable of resting a height in the range of from 0.5 feet to 10 feet above the sea floor. In such embodiments, bottom surface 223 may be capable of resting a height in the range of from 1 foot to 3 feet above the sea floor. In certain embodiments, a subsea pipeline may be wrapped around spool 220 contacting spooling surface 221. In certain embodiments, spool 220 may define a cavity. In certain embodiments, pile 210 may be capable of being disposed within the cavity. In certain embodiments, spool 220 may surround pile 210.

In certain embodiments, pile 210 may be connected to spool 220 by connectors 224. In certain embodiments, connectors 224 may comprise any combination of features discussed above with respect to connectors 124.

In certain embodiments, spooling structure 200 may comprise one or more pipe supports 230. In certain embodiments, pipe supports 230 may comprise any combination of features discussed above with respect to pipe supports 130. In certain embodiments, pipe supports 230 may be non-movable.

In certain embodiments, spooling structure assembly 200 may further comprise locking dogs 240. In certain embodiments, locking dogs 240 may keep spool 200 latched to the pile 210. In certain embodiments, locking dogs 240 may comprise one or more pins anchored into spool 220.

Figure 3:
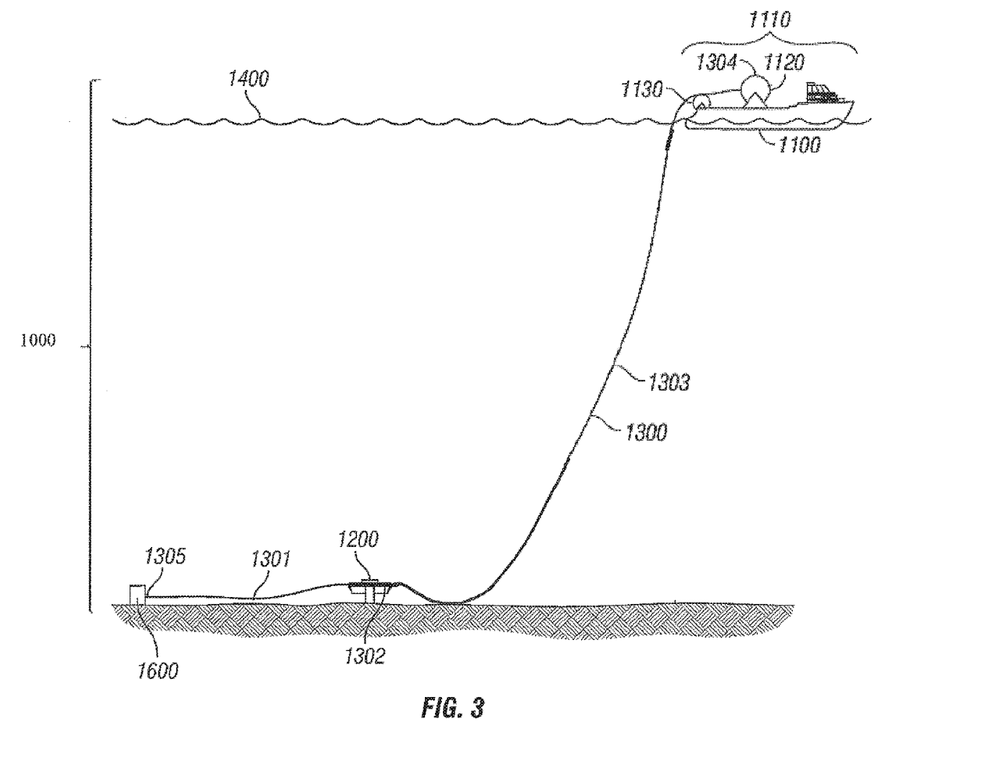
FIG. 3 illustrates a subsea pipeline system in accordance with certain embodiments of the present disclosure.

In certain embodiments, the present disclosure provides a subsea pipeline laying system. Referring now to FIG. 3, FIG. 3 illustrates subsea pipeline laying system 1000. In certain embodiments, subsea pipeline laying system 1000 may comprise pipe laying vessel 1100, spooling structure assembly 1200, and pipeline 1300.

In certain embodiments, pipe laying vessel 1100 may be any type of vessel that is capable of laying a subsea pipeline. Examples of suitable vessels are described in U.S. Pat. Nos. 5,971,666, 5,836,719, and 3,438,213, European Patent No. 3,438,213, and U.S. Patent Application Publication Nos. 20014/0334880, 2014/0227039, 2012/0020739, and 2011/0274498, the entireties of which are hereby incorporated by reference.

In certain embodiments, pipe laying vessel 1100 may be designed for S-lay, J-lay, or Reel-lay operations. In certain embodiments, pipe laying vessel 1100 may comprise a pipe deployment system 1110. In certain embodiments, pipe deployment system 1110 may be an S-lay system, a J-lay system, or a Reel-lay system. In certain embodiments, as illustrated in FIG. 3, pipe deployment system 1110 is a Reel-lay system comprising a Reel 1120 and a straightener 1130. In other embodiments, not illustrated in FIG. 3, pipe deployment system 1110 may be an S-lay system comprising a tensioner, a stinger, and one or more welding (joining) stations or a J-lay system comprising a hinged ramp or tower and a support to effect welding (joining).

In certain embodiments, pipe laying vessel 1100 may be floating on sea surface 1400. In certain embodiments, pipe laying vessel 1100 may be capable of deploying pipeline 1300 to sea floor.

In certain embodiments, spooling structure assembly 1200 may comprise any subsea structure capable of receiving one or more wraps, or a partial wrap, of a subsea pipeline. In certain embodiments, spooling structure assembly 1200 may comprise any combination of features discussed above with respect to spooling structure assembly 100 and spooling structure assembly 200.

In certain embodiments, pipeline 1300 may comprise any conventional subsea pipeline or flowline. In certain embodiments, pipeline 1300 may comprise any pipe, pipeline, or flowline described in U.S. Pat. Nos. 5,971,666, 5,836,719, and 3,438,213, European Patent No. 3,438,213, and U.S. Patent Application Publication Nos. 20014/0334880, 2014/0227039, 2012/0020739, and 2011/0274498, the entireties of which are hereby incorporated by reference.

In certain embodiments, pipeline 1300 may comprise first portion 1301, second portion 1302, third portion 1303, and fourth portion 1304. In certain embodiments, first portion 1301 may be a portion resting on sea floor. In certain embodiments, a first end 1305 of first portion 1301 may be fluidly or mechanically connected to a subsea structure 1600. In certain embodiments, subsea structure 1600 may comprise a subsea well head, a subsea manifold, or a pipeline end termination structure. In other embodiments, a first end of first portion 1301 may be not connected to a subsea structure.

In certain embodiments, second portion 1302 may be a portion wrapped around spooling structure assembly 1200. In certain embodiments, second portion 1302 may be wrapped around spooling structure assembly 1200 a single time or multiple times. In other embodiments, second portion 1302 may be wrapped around spooling structure assembly 1200 less than a single time. In certain embodiments, second portion 1302 may comprise an expansion loop.

In certain embodiments, third portion 1303 may comprise a portion suspended between seafloor and sea surface 1400. In certain embodiments, third portion 1301 may also comprise a portion of the subsea that runs across the seafloor and a touchdown point.

In certain embodiments, fourth portion 1304 may be wound around reel 1120.

Figure 4:
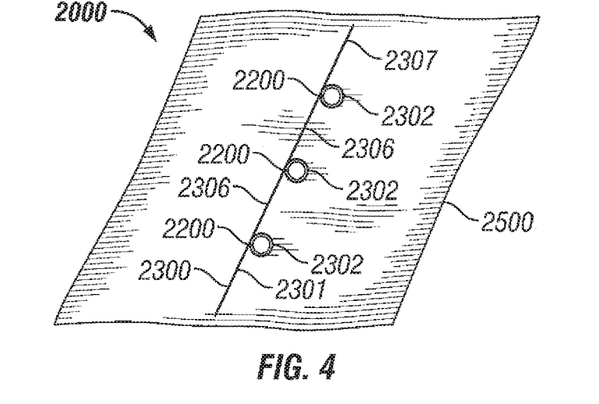
FIG. 4 illustrates a plan view of a subsea pipeline system in accordance with certain embodiments of the present disclosure.
Figure 5:
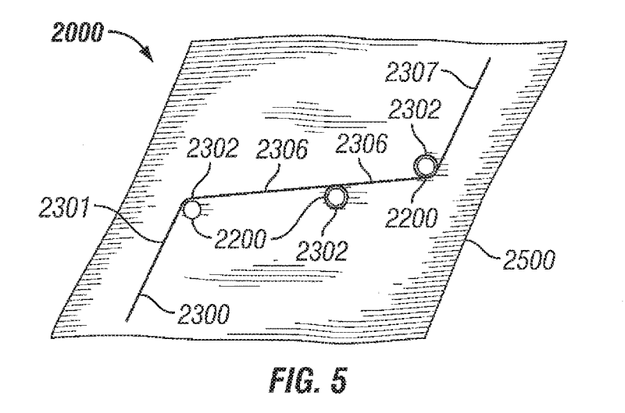
FIG. 5 illustrates a plan view of a subsea pipeline system in accordance with certain embodiments of the present disclosure.
Figure 6:
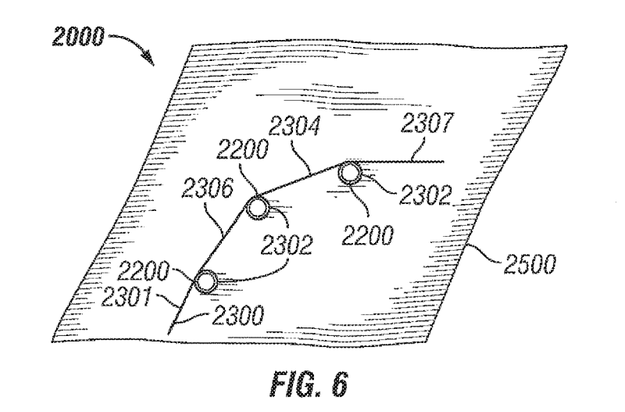
FIG. 6 illustrates a plan view of a method of laying a subsea pipeline in accordance with certain embodiments of the present disclosure.

In certain embodiments, the present disclosure provides a subsea pipeline system 2000. Referring now to FIGS. 4, 5, and 6, in certain embodiments, subsea pipeline system 2000 may comprise one or more spooling structure assemblies 2200, pipeline 2300, and sea floor 2500. In certain embodiments, spooling structure assembly 2200 may comprise any combination of features discussed above with respect to spooling structure assembly 100, 200, and/or 1200.

In certain embodiments, pipeline 2300 may comprise any combination of features discussed above with respect to pipeline 1300. In certain embodiments, pipeline 2300 may comprise first portion 2301, one or more second portions 2302, one or more third portion 2306, and fourth portion 2307. In certain embodiments, first portion 2301 may comprise any combination of features discussed above with respect to first portion 1301. In certain embodiments, a first end of first portion 2301 may be fluidly or mechanically connected to a subsea structure (not illustrated in FIGS. 4, 5, or 6). In certain embodiments, the subsea structure may comprise a subsea well head, a subsea manifold, or a pipeline end termination structure.

In certain embodiments, the one or more second portion 2302 may be portions wrapped around the one or more spooling structure assemblies 2200. As shown in FIGS. 4, 5, and 6 subsea pipeline system 2000 may comprise three second portions 2302 and three spooling structure assemblies 2200. In FIG. 6, subsea pipeline system 2000 is shown to have a curve stability feature, independent of the use as expansion loops, wherein a curved path is converted into a series of straight segments. As shown in FIG. 6, each of the spooling structure assemblies 2200 may be placed along a perimeter of a curve and each of the one or more third portions 2306 may provide a straight line between each of the spooling structure assemblies 2200.

In other embodiments, subsea pipeline system 2000 may comprise one, two, three, four, five, or more second portions 2302 each wrapped around a separate spooling structure assembly 2200. In certain embodiments, each second portion 2302 may be wrapped around a separate spooling structure assembly 2200 a single time or multiple times. In other embodiments, each second portion 2302 may be wrapped around a separate spooling structure 2200 less than a single time. In certain embodiments, each second portion 2302 may comprise an expansion loop.

In certain embodiments, each second portion 2302 may be connected to each other by a third portion 2306. In certain embodiments, each third portion 2306 may have a length in the range of from 1000 feet to 10,000 feet from each other. In other embodiments, each third portion 2306 may have a length in the range of from 50 feet to 200 feet.

In certain embodiments, each second portion 2302 may be arranged in a straight line, as illustrated in FIG. 4. In other embodiments, as illustrated in FIG. 5, each second portion 2302 may be not arranged in a straight line.

In certain embodiments, fourth portion 2307 may comprise a first end fluidly or mechanically connected to a subsea structure or riser (not illustrated in FIG. 4 or 5). In certain embodiments, the subsea structure may comprise a subsea well head, a subsea manifold, or a pipeline end termination structure.

In certain embodiments, the present disclosure provides a method comprising: providing a pipe laying vessel, placing a spooling structure assembly on the seafloor, and laying the subsea pipeline in a loop around the spooling structure assembly.

In certain embodiments, the pipe laying vessel may be any pipe laying vessel described above with respect to pipe laying vessel 1100. In certain embodiments, the spooling structure assembly may comprise any spooling structure assembly discussed above with respect to spooling structure assemblies 100, 200, 1200, and/or 2200. In certain embodiments, the spooling structure assembly may comprise a spool and a pile.

In certain embodiments, placing the spooling structure assembly on the seafloor may comprise driving a pile of the spooling structure assembly into the seafloor. In certain embodiments, the pile may be driven a distance of from 50 feet to 100 feet into the seafloor. In certain embodiments, the pile may be driven into the sea floor until a bottom surface of the spool rests of the seafloor. In other embodiments, the pile may be driven into the sea floor until a bottom surface of the spool is suspended a distance in the range of from 1 foot to 3 feet above the sea floor.

In certain embodiments, the spooling structure assembly may be placed on the sea floor at a spooling location. In certain embodiments, the spooling location may be a distance in the range of from 1000 feet to 2000 feet from a subsea structure. In certain embodiments, the subsea structure may comprise any subsea structure discussed above with respect to subsea structure 1600.

In certain embodiments, laying the subsea pipeline in a loop around the spooling structure assembly may comprise laying a first portion of the subsea pipeline from the pipe laying vessel and then laying a second portion of the subsea pipeline from the pipe laying vessel.

In certain embodiments, the first portion of the subsea pipeline may be laid before the spooling structure assembly is placed on the sea floor and the second portion of the subsea pipeline may be laid after the spooling structure assembly is placed on the sea floor. In certain embodiments, the first portion of the subsea pipeline may be laid after placing the spooling structure assembly on the sea floor. In certain embodiments, the spooling structure assembly may be placed on the sea floor while the first portion of the subsea pipeline is laid.

In certain embodiments, the first portion of the subsea pipeline may be laid in a direction toward the spooling location and/or the spooling structure assembly. In such embodiments, the pipe laying vessel may move in a direction towards the spooling location and/or the spooling structure assembly while laying the pipeline. In certain embodiments, first portion of the subsea pipeline may be laid toward the direction toward the spooling location and/or the spooling structure assembly until the touchdown point of the pipeline passes the spooling location/and or the spooling structure assembly. In certain embodiments, the first portion of the subsea pipeline may be laid until the touchdown point moves past the spooling structure assembly a distance equal to at least the circumference of the spooling structure assembly. In certain embodiments, the first portion of the subsea pipeline may be laid until the touchdown point moves past the spooling structure assembly a distance equal to an amount in the range of at least 120% to 130% of the circumference of the spooling structure assembly. In other embodiments, the distance may be greater than 130% of the circumference of the spooling structure assembly.

In certain embodiments, laying the second portion of the subsea pipeline may comprise laying the subsea pipeline in a manner such that the second portion of the subsea pipeline is wrapped around the spooling structure assembly. In certain embodiments, the second portion of the subsea pipeline may be wrapped around the spooling structure assembly by deploying the pipeline from the laying vessel while the laying vessel moves along a perimeter of an approximate circle. The instant center of the perimeter curve is the point at which the pipe being wrapped is tangent to the spool. In certain embodiments, the size of the perimeter curve may depend on the depth of the seafloor at the spooling location. In certain embodiments, the size of the perimeter curve depends on the depth of the water and the angle the pipeline makes with the vertical as it enters the water's surface at the laying vessel.

In certain embodiments, the diameter may be in the range of from 2400 feet to 2600 feet. In other embodiments, the diameter may be greater than 2600 feet. In certain embodiments, the diameter may be in the range of from 30% of the water depth to 50% of the water depth.

In certain embodiments, the vessel may make a single revolution along the perimeter of the circle while laying the second portion of the subsea pipeline. In certain embodiments, the vessel may make more than a single revolution along the perimeter of the circle while laying the second portion of the subsea pipeline. In certain embodiments, the vessel may revolve an extra 20 to 30 degrees around the perimeter of the circle. In such embodiments, the vessel may then move an equal number of degrees in the reverse direction while continuing to lay pipeline or not laying pipeline. In certain embodiments, the vessel may make less than a single revolution along the perimeter of the circle while laying the second portion of the subsea pipeline.

In certain embodiments, the method may comprise removing the spooling structure assembly. In certain embodiments, the spooling structure assembly may be removed by being lifted by a crane. In certain embodiments, the spooling structure assembly may be removed by removing the spool and leaving the pile on the sea floor. In other embodiments, the spooling structure assembly may be removed by removing the spool and the pile and leaving the pipe supports on the sea floor.

In certain embodiments, the method may further comprise laying a third portion of the subsea pipeline. In certain embodiments, laying a third portion of the subsea pipeline may comprise laying a portion of the subsea pipeline in a direction towards a second spooling location and/or spooling structure assembly. In certain embodiments, the third portion of the subsea pipeline may be laid along a path in the same direction that the first portion of the subsea pipeline was laid. In other embodiments, the third portion of the subsea pipeline may be laid along a path that is not the same direction that the first portion of the subsea pipeline was laid.

In certain embodiments, third portion of the subsea pipeline may be laid toward the direction of the second spooling location and/or the second spooling structure assembly until the touchdown point of the pipeline passes the second spooling location/and or the second spooling structure assembly. In certain embodiments, the third portion of the subsea pipeline may be laid until the touchdown point moves past the second spooling structure assembly a distance equal to at least the circumference of the second spooling structure assembly. In certain embodiments, the third portion of the subsea pipeline may be laid until the touchdown point moves past the second spooling structure assembly a. distance equal to an amount in the range of at least 120% to 130% of the circumference of the second spooling structure assembly.

In certain embodiments, the method may further comprise laying a fourth portion of the subsea pipeline. In certain embodiments, laying the fourth portion of the subsea pipeline may comprise laying the subsea pipeline in a manner such that the fourth portion of the subsea pipeline is wrapped around the second spooling structure assembly. In certain embodiments, the fourth portion of the subsea pipeline may be wrapped around the second spooling structure by deploying the pipeline from the laying vessel while the laying vessel moves along a perimeter of a second circle. In certain embodiments, the second circle may have a center point located approximately above the second spooling structure assembly. In certain embodiments, the diameter of the second circle may depend on the depth of the seafloor at the second spooling location. In certain embodiments, the size of the second circle depends on the depth of the water and the angle the pipeline makes with the vertical as it enters the water's surface.

In certain embodiments, the size of the perimeter curve may be in the range of from 2400 feet to 2600 feet. In other embodiments, the size of the perimeter curve may be greater than 2600 feet. In certain embodiments, the diameter may be in the range of from 30% of the water depth to 50% of the water depth.

In certain embodiments, the vessel may make a single revolution along the perimeter of the second circle while laying the fourth portion of the subsea pipeline. In certain embodiments, the vessel may make more than a single revolution along the perimeter of the second circle while laying the fourth portion of the subsea pipeline. In certain embodiments, the vessel may revolve an extra 20 to 30 degrees around the perimeter of the second circle. In such embodiments, the vessel may then move an equal number of degrees in the reverse direction while continuing to lay pipeline or not laying pipeline. In certain embodiments, the vessel may make less than a single revolution along the perimeter of the second circle while laying the second portion of the subsea pipeline.

In certain embodiments, the method may comprise removing the second spooling structure assembly.

In certain embodiments, the methods discussed above may be repeated for laying any number of additional portions of subsea pipelines.

In certain embodiments, the method may further comprise connecting a first end of the subsea pipeline to a subsea structure and connecting a second end of the subsea pipeline to another subsea structure or surface structure with a riser.

To facilitate a better understanding of the present invention, the following examples of certain aspects of some embodiments are given. In no way should the following examples be read to limit, or define, the scope of the invention.

EXAMPLES

Figure 7:
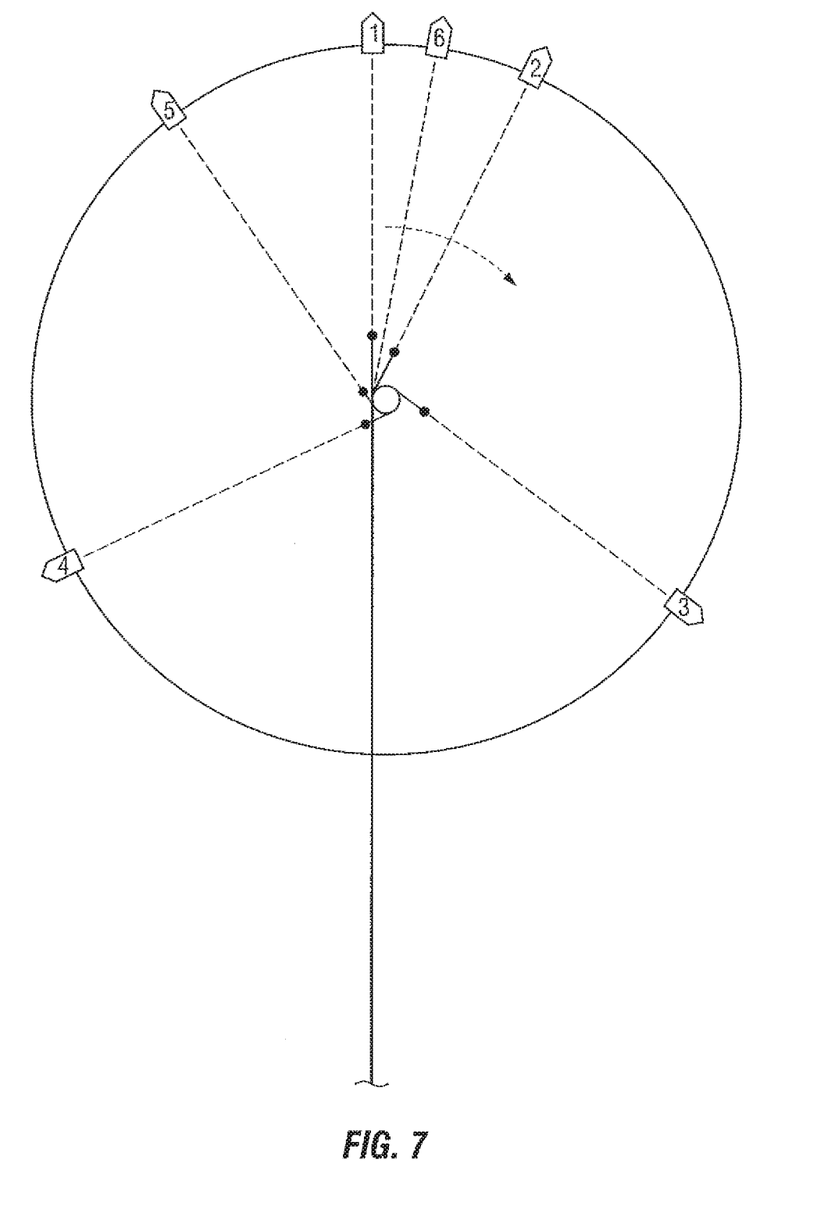
FIG. 7 illustrates one embodiment for constructing an expansion loop on a seafloor.

A method of constructing an expansion loop on a seafloor is illustrated in FIG. 7. FIG. 7 illustrates a plan view looking down on a sea surface to a seafloor. The method employs a pipe laying vessel that is in the process of placing a subsea pipeline on the seafloor. FIG. 7 illustrates various positions of the pipe laying vessel as it constructs an expansion loop on the seafloor.

Now referring to FIG. 7, FIG. 7 illustrates the various positions of a lay vessel relative to a spooling structure assembly while laying a subsea pipeline. In FIG. 7, the dashed portions of the subsea pipeline indicate the portions of the subsea pipeline that are suspended from the lay vessel and the solid line portions indicate the portions of the subsea pipeline that are resting on the seafloor. The point where the solid line portions and the dashed portions of interest indicate where the touchdown point of the subsea pipeline is for each position of the lay vessel.

In the pipe laying process, the lay vessel proceeds in a lay direction as conduit is added to the span. Near the touchdown point associated with Position 1, and roughly tangent to the conduit path, a spooling structure assembly is located on the seafloor. In order to form a loop the lay vessel moves in roughly a circular path, whose radius depends on the water depth, to Position 2, and the subsea pipeline begins to wrap around the spooling structure assembly. Horizontal tension that is pulling on the pipeline during the pipe laying process provides a mechanism to form the wrap around the spooling structure. The lay vessel may then continue its heading along an approximately radial line drawn on the seafloor from the tangent point at the spooling structure assembly and perpendicular to the arc at the vessel location. Alternatively the vessel may continue on a different heading. The vessel may then move successively to Positions 3, 4, 5 and 1. In some cases the lay vessel may move beyond the original position, Position 1 to Position 6, in order to move the final tangent point to the spooling structure assembly to approximately the initial tangent point of the spooling structure assembly. The lay vessel may then move away from the spool or mandrel along its initial lay direction or at a new lay direction. This method may then be repeated for creating a second loop.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

That which is claimed is:

1. A spooling structure assembly comprising: a pile, a spool surrounding the pile, the spool having a taper such that a top outside diameter at a top surface of the spool is larger than a bottom outside diameter at a bottom surface of the spool, and a pipe support attached to the spool, wherein the pipe support is moveable with respect to the spool.

2. The spooling structure assembly of claim 1, wherein the pile is disposed within a cavity defined by the spool.

3. The spooling structure assembly of claim 1, wherein the pile has a diameter in the range of from 5 feet to 30 feet and a length in the range of from 25 feet to 150 feet.

4. The spooling structure assembly of claim 1, wherein the spool has a diameter in the range of from 10 feet to 100 feet and a height in the range of from 1 foot to 20 feet.

5. The spooling structure assembly of claim 1, wherein the pipe support comprises a single protrusion around an entire circumference of the spool.

6. The spooling structure assembly of claim 1, wherein the pipe support comprises multiple protrusions equispaced along a circumference of the spool.

7. The spooling structure assembly of claim 1, further comprising a subsea pipeline wrapped around the spool.

8. The spooling structure assembly of claim 7, wherein the subsea pipeline is wrapped around the spool in an amount in the range of from 30 degrees to 330 degrees.

9. The spooling structure assembly of claim 7, wherein the subsea pipeline is wrapped around the spool in an amount in the range of from 360 degrees to 540 degrees.

10. The spooling structure assembly of claim 7, wherein the subsea pipeline is wrapped around the spool multiple times.

11. A subsea pipeline system comprising: a pipe laying vessel, a subsea pipeline, and a spooling structure assembly, wherein the subsea pipeline is wrapped around the spooling structure assembly, wherein the spooling structure assembly comprises a pile, a spool surrounding the pile, the spool having a taper such that a top outside diameter at a top surface of the spool is larger than a bottom outside diameter at a bottom surface of the spool, and a pipe support attached to the spool, wherein the pipe support is moveable with respect to the spool, and wherein the spooling structure assembly is adapted to be placed on the seafloor.

12. The subsea pipeline system of claim 11, wherein the subsea pipeline is wrapped around the spooling structure assembly as an expansion loop.

13. The subsea pipeline system of claim 11, further comprising a second spooling structure assembly, wherein the subsea pipeline is wrapped around the second spooling structure assembly.

14. A method of laying subsea pipeline on a seafloor comprising: providing a pipe laying vessel, placing at least two spooling structure assemblies on the seafloor, and laying the subsea pipeline in a continuous loop around the at least two spooling structure assemblies, wherein the at least two spooling structure assemblies each comprise a pile, a spool surrounding the pile, and a pipe support attached to the spool, wherein the spool has a taper such that a top outside diameter at a top surface of the spool is larger than a bottom outside diameter at a bottom surface of the spool.

15. The method of claim 14, further comprising laying the subsea pipeline away from a first of the at least two spooling structure assemblies towards a second of the at least two spooling structure assemblies.

16. The method of claim 14, wherein the pipe support is moveable with respect to the spool.

17. A method of laying subsea pipeline on a seafloor comprising: providing a pipe laying vessel, placing at least two spooling structure assemblies on the seafloor, and laying the subsea pipeline in a continuous loop around the at least two spooling structure assemblies, wherein the at least two spooling structure assemblies each comprise a pile, a spool surrounding the pile, and a pipe support attached to the spool, wherein the pipe support is moveable with respect to the spool.

18. The method of claim 17, wherein the spool has a taper such that a top outside diameter at a top surface of the spool is larger than a bottom outside diameter at a bottom surface of the spool.

19. The method of claim 17, further comprising laying the subsea pipeline away from a first of the at least two spooling structure assemblies towards a second of the at least two spooling structure assemblies.

\* \* \* \* \*